United States Patent [19]
Ogawa

[11] Patent Number: 6,141,751
[45] Date of Patent: Oct. 31, 2000

[54] USER IDENTIFYING METHOD AND SYSTEM IN COMPUTER COMMUNICATION NETWORK

[75] Inventor: Hideharu Ogawa, Tokyo, Japan

[73] Assignee: Media Connect Ltd., Tokyo, Japan

[21] Appl. No.: 09/032,213

[22] Filed: Feb. 27, 1998

[30] Foreign Application Priority Data

Feb. 28, 1997 [JP] Japan .................................. 9-060075

[51] Int. Cl.[7] .................................................. G06F 15/00
[52] U.S. Cl. ........................................... 713/170; 713/202
[58] Field of Search .................................. 713/200, 201, 713/202, 170; 709/229; 380/216, 217, 229, 230, 232, 233, 234

[56] References Cited

U.S. PATENT DOCUMENTS

| | | | |
|---|---|---|---|
| 4,893,338 | 1/1990 | Pastor | 380/25 |
| 4,962,530 | 10/1990 | Cairns | 380/23 |
| 5,016,274 | 5/1991 | Micali et al. | 380/23 |
| 5,161,190 | 11/1992 | Cairns | 380/23 |
| 5,537,475 | 7/1996 | Micali | 380/30 |
| 5,719,841 | 2/1998 | Kitayama | 369/59 |
| 5,920,879 | 7/1999 | Kyojima et al. | 707/517 |
| 5,987,133 | 11/1999 | Aisaka | 380/25 |

*Primary Examiner*—Robert W. Beausoliel, Jr.
*Assistant Examiner*—Pierre Eddy Elisca
*Attorney, Agent, or Firm*—Thorp Reed & Armstrong, LLP

[57] ABSTRACT

A simple, convenient and reliable method provided for identifying a user through a computer network. This method comprises the steps of sending a string of characters randomly selected from a table recording a set of characters from a central computer to a terminal computer, converting one or more characters from the string according to a conversion rule, sending one or more characters from the terminal computer to the central computer and identifying the user of the terminal computer based on the string of characters sent from the central computer, the conversion rule and the one or more characters sent by the user.

18 Claims, 2 Drawing Sheets

USER IDENTIFYING METHOD AND SYSTEM IN COMPUTER COMMUNICATION NETWORK

TECHNICAL FIELD

The present invention relates to a user identifying method and system in a computer communication network.

RELATED ART

Development of computer communication networks is remarkable in these years. Opportunities of providing, getting, transmitting and managing information based on the world wide web (WWW) and home pages as well as applications of the networks to electronic transactions, etc. are ever-increasing and will be spread widely even into the general public.

A problem involved in connection with the use of a computer communications network is the identification of a user. User identification is highly important because it serves as a signature in the calculation of a user's charge or in an electronic transaction taking place over the computer communication network.

There has been widely used at present such a user identifying technique that in a host computer (central computer) connected via a communication network, such as a telephone line, with terminal computers possessed by many users, each user wanting to use the central computer pre-registers his password or encrypted data. When the user wants to use the central computer, he transmits the password from his own terminal computer to the central computer via the communication network, where it is compared with the registered password to validate the identity of the user.

OBJECT OF THE INVENTION

The technique of using a pre-registered password involves a problem when the user wants to use the network with through a terminal computer other than his own computer, as a computer or Internet cafe possessed by a third party. In such a case, the third party computer can be configured to secretly record a character string entered by the user from a keyboard, and the user's password is thereby easily discovered.

Further, when the pre-registered password method is employed, and the user is permitted to set his own password, and in particular, when the user is a novice, the user often tends to use a common phrase, such as his own name, birth date, etc., which can be easily decoded. Furthermore, in utilizing this method it may be necessary to make the password long for security purposes, thereby making it difficult for the user to memorize the password. For this reason the novice user often notes the password on a notebook or the like, allowing for the possibility that the secrecy of the password could be compromised should the notebook be stolen.

In addition, since the user's identity is generally checked only at the start of a user's session with the central computer, if the user temporarily leaves the terminal computer, there is a danger that an unauthorized user could use the terminal computer to access central computer. For these reasons, the use of a password system may present a security problem under certain conditions.

It is therefore an object of the present invention to solve the above problems and to provide a user identifying method which even a novice can easily use, and by which a password cannot be easily discovered by others.

SUMMARY OF THE INVENTION

Having the above mentioned objects, the present invention is summarized as follows.

A first embodiment of the invention is directed to a user identifying method in a computer communication network comprising:

(a) a step of sending a display character string composed of characters selected from a predetermined character set from a central computer to a terminal computer;

(b) a second step of converting the display character string based on a predetermined conversion rule to obtain an input character string to be entered by a user;

(c) a third step of sending the obtained input character string from the terminal computer to the central computer by the user; and (d) a fourth step of identifying the user by the central computer based on the display character string, predetermined conversion rule and input character string.

A second embodiment of the invention is directed to a user identifying method, wherein the second step in the first embodiment of the invention includes:

(a) a step of searching by the user the positions, described in a password conversion table, of one or more characters located at predetermined password character positions within the display character string; and (b) a step of acquiring characters from the password conversion table located at positions shifted by a predetermined number of rows and columns with respect to one or more searched characters to obtain the input character string to be entered by the user.

A third embodiment of the invention is directed to a user identifying method, wherein the second step includes:

(a) a step of having the user search a position or positions of characters of the display character string in a password conversion table located at a predetermined password shift designation character position or positions, and comparing the searched position or positions with a reference position or positions to obtain row and column shift numbers and shift directions;

(b) a step of having the user, search a position or positions of a character or characters of the display character string located at predetermined password character position or positions in a password conversion table; and (c) a step of acquiring a character or characters from the password conversion table, located at a position or positions shifted by a predetermined number of rows and columns with respect to one or more characters on the basis of the searched position or positions, to obtain the input character string to be entered by the user.

A forth embodiment of the invention is directed to a medium containing a program which when executed will cause the central computer to perform the first and fourth steps in the user identifying method as set forth in any of the first to third inventions.

A fifth embodiment of the invention is directed to a medium containing a program which when executed will cause the terminal computer to perform the second step in the first to third inventions.

A sixth embodiment of the invention is directed to a medium containing a program which when executed will cause the terminal computer to perform the third step in the first to third inventions.

A seventh embodiment of the invention is directed to a computer system including a central computer and a terminal computer, in which the central computer and the terminal computer communicate with each other through a computer communication network, said computer system comprising:

(a) a first device for sending a display character string composed of characters selected from a predetermined character set from the central computer to the terminal computer;

(b) a second device for converting the display character string based on a predetermined conversion rule to obtain an input character string to be entered by a user;

(c) a third device for sending the obtained input character string from the terminal computer to the central computer by the user; and (d) a fourth device for identifying the user by central computer based on the display character string, the predetermined conversion rule and the input character string.

A eighth embodiment of the invention is directed to a central computer in a computer communication network including a terminal computer, the central computer comprising:

(a) a first device for sending a display character string composed of characters selected from a predetermined character set to the terminal computer;

(b) a second device for receiving an input character string to be entered by a user in the terminal computer;

(c) a third device for identifying the user based on the display character string, a predetermined conversion rule and the input character string.

A ninth embodiment of the invention is directed to a card for user identification in a computer communication network wherein said card contains a two dimensional table in which characters in a predetermined character set are recorded in m rows and n columns and which is arranged such that characters recorded at the positions (x,y), (x, y+s), (x+r, y) and (x+r, y+s) are identical, where m, n, x, y, r and s are positive integers, (x+r) is less than or equal to m, and (y+s) is less than or equal to n.

A tenth embodiment of the invention is directed to a memory means in which the table is stored.

DETAILED DESCRIPTION OF THE INVENTION

Figure 1:
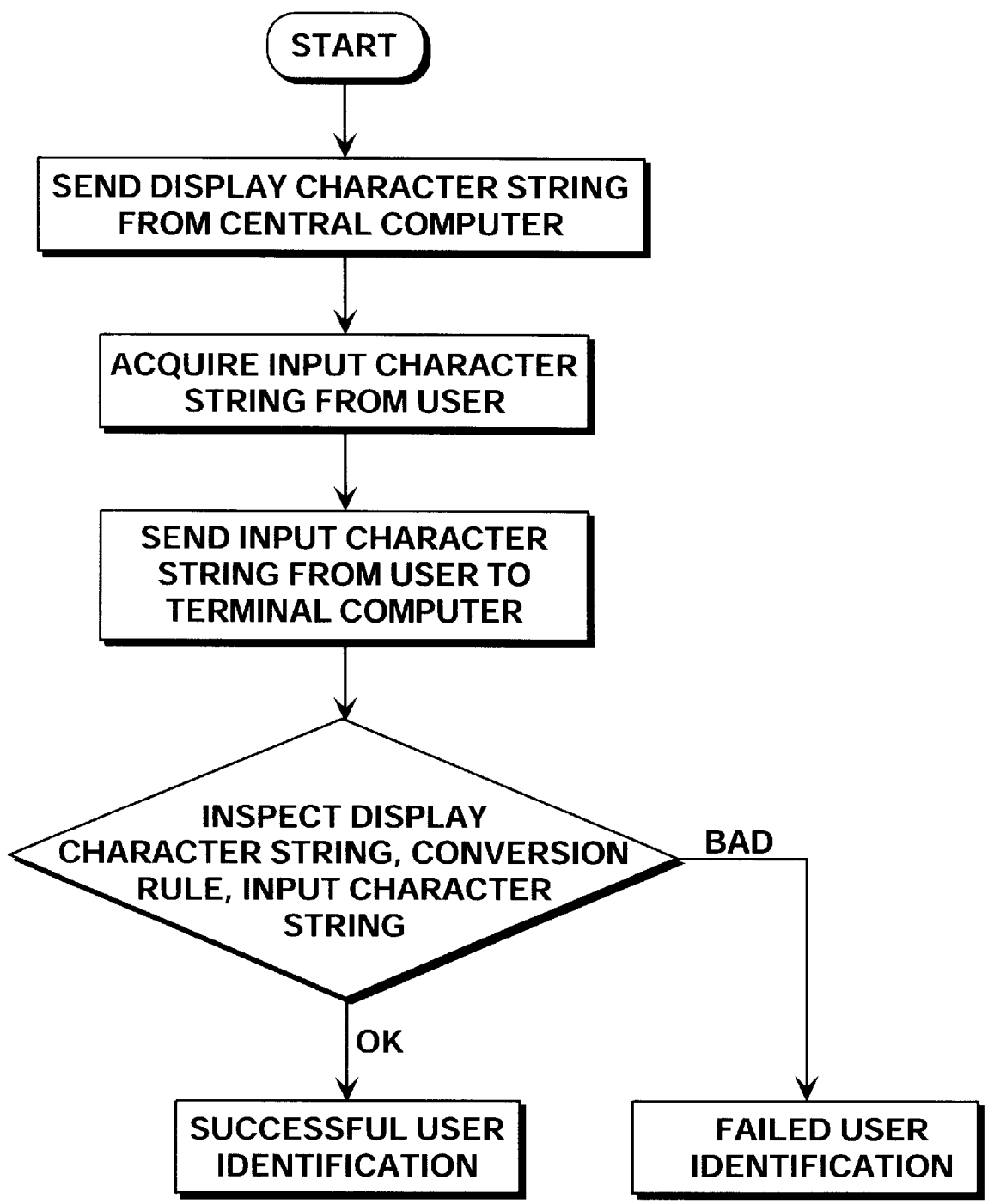
FIG. 1 shows a procedural flow diagram of the present invention.

Explanation will be made as to an example of the preferred mode for carrying out the invention. The present invention provides a simple user identifying method which uses a password conversion rule to prevent a user's password from being easily decoded by others in a computer communication network. In communication between a central computer and a terminal computer, when the communication is already established, FIG. 1 shows the method of user identification of the present invention.

(1) The central computer sends a display character string to a terminal computer, where it is displayed to the user.

(2) The user converts the display character string, based on a predetermined password conversion rule, and sends its conversion result from the terminal computer to the central computer.

(3) The central computer collates the display character string, the password conversion rule used by the user, and the character string of the converted result received from the terminal computer to identify the user.

"Password" in a prior art user identifying method corresponds to the "password conversion rule" in the present invention. The present invention is largely different from the prior art user identifying method in that the central computer can verify whether or not the user currently using the central computer is an authorized user, by sending the display character string at a any desired time point at which the central computer wants to identify the user.

Characters in the display character string include, e.g., the character sets which follow.

(1) Alphanumeric set. A display character string is, for example, "F G K L T S N O".

(2) Numeric set of plural digits. A display character string is, for example, "12 45 67 34 02 44 38 28".

(3) Character set associated with different languages. In the case of Japanese characters, for example, a display character string is made up of Hiragana alone or made up of Kanji and Kana.

A subset of these character sets can be used in the display character string as a character set. By randomly selecting a plurality of characters from these character sets to generate the display character string, or by previously preparing many display character strings and randomly selecting one, the center can determine the display character string to be displayed on the terminal computer. In general, it is desirable to generate a display character string on the basis of random numbers based on such seeds as the current time.

Alternative embodiments of the present invention may utilize different password conversion rules, for example:

(1) A character in an alphanumeric display character string at a predetermined position is returned as it is. The predetermined position is set to be different with respect to each user. For example, when the display character string is "M P Q H R S B R" and the predetermined positions are the seventh and third positions, the conversion result is "QB".

(2) In a numeric display character string, a predetermined calculation is carried out for a number in the display character string at a predetermined position. The predetermined position and predetermined calculation is different for each user. Examples of the predetermined calculation are, for example, "add 1", "subtract 3", "divide by 2" or "multiply by 5". For example, when the display character string is "12 45 67 34 02 44 38 28", the predetermined position is "seventh and third position", and the predetermined calculation is "add 1", the result is "39 68". Although the character set in the example display character string utilizes two digit numbers having any number of digits may be employed.

(3) Conversion is carried out with use of a password conversion table which will be described later.

In the above conversion rule, a character in the display character string located at a predetermined position is used for the conversion, in which case it is desirable to make the length of the display character string sufficiently longer than the numbers associated with the predetermined positions. For example, in any of the above cases (1) and (2), the "seventh and third positions" is employed as the predetermined positions. For this reason, the length of the display character string must be at least 7 characters. A longer display character string will lower the possibility of the conversion rule being decoded.

In accordance with the present invention, a password having a lesser number of characters than the prior art password can be used with sufficient security. For example, when "an alphanumeric set of upper/lower case sensitivity" is selected, 62 sorts of characters can be utilized, so that a password can be selected from about 3,800 combinations in the case of 2 characters, and be selected from about 240,000 combinations in the case of 3 characters. The case of 3 characters will be sufficiently safe even when compared to the user identification (10,000 combinations) of 4-digit numeric passwords currently in use with, for example, an automatic teller machine.

Further, a character string to be entered by a user from his terminal varies depending on the display character string displayed by the central computer at the time of verifying the user, so that, even when the entered characters were secretly recorded, the password will not be stolen. Therefore, even when the user makes access to the computer communication network with use of a computer not possessed by the user as a terminal, the user can safely use the central computer.

Further, the central computer can ask several times for validation of the user's identity during user's use of the central computer, so that, for example, if the user leaves his terminal computer unattended, and a malicious third person starts using the computer in place of the authorized user, the damage caused by the unauthorized use can be minimized if the central computer asks the user to validate his identity at timed intervals.

For the aforementioned operations, computer programs used by the central computer and user can be stored on a floppy disk, hard disk or any other memory medium. The use of these memory media is desired to provide convenience for the central computer and the and the user.

Explanation will now be made as to a conversion rule with use of a password conversion table which forms one of inventions of the present application. The password conversion table is provided by a center, for example, by a host computer management department such as would be found at a school or a company or by a network provider to users of the computer communication network. It is desirable to describe the password conversion table in a card, etc. The card having the password conversion table described therein can also be used as an ID card, membership card or the like.

The password conversion table consists of blocks or cells defined by n rows and m columns (n and m being each a positive integer), the cells containing characters in the aforementioned character sets. An example of such a card is shown in FIG. 2.

A part surrounded by thick lines corresponds to a fundamental part of a password conversion table which consists of 5 rows and 5 columns. The password conversion table shown in FIG. 2 consists of 9 rows and 9 columns, including the fundamental password conversion table in its center and the other two rows and two columns corresponding to parts of vertical and horizontal shifts of the password conversion table around the fundamental password conversion table.

Figure 2:
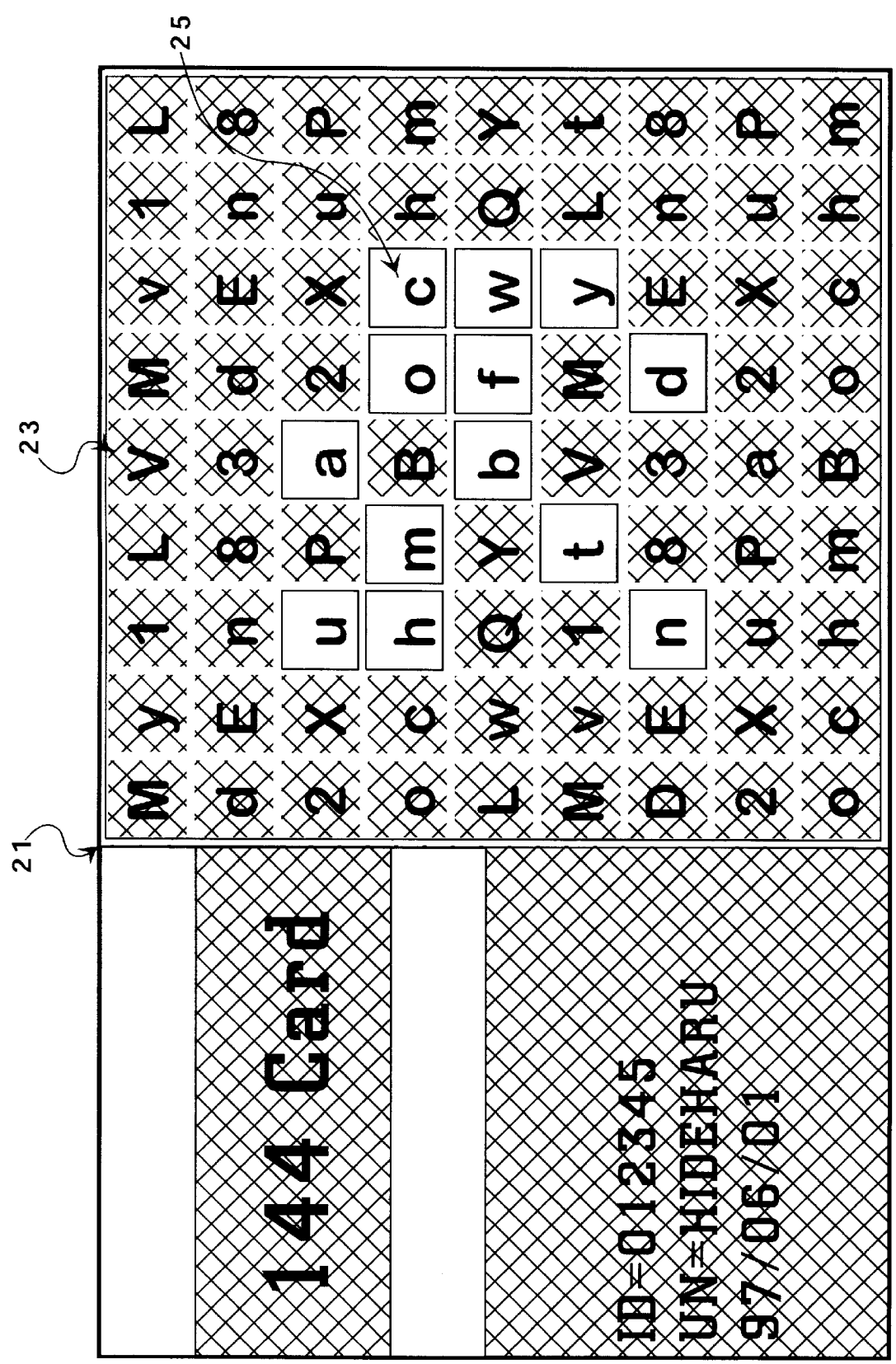
FIG. 2 shows a card having a password conversion table described therein.

Rules which follow are considered as conversion rules using the password conversion table of FIG. 2.

(1) Characters located at predetermined positions are extracted from a display character string. As an example, assume that the display character string is "B1X2dvF4QH6" and the predetermined positions are "fifth, first and ninth positions". Then the extracted characters are "dBQ".

(2) The respective extracted characters are searched in the password conversion table and characters in cells of the table as shifted by predetermined row and column numbers with respect to each of the extracted characters are used in place of the extracted characters. For example, when a predetermined row and column shift of "one row below, one column right" is used, then the "one row below, one column right" for "d" in the password conversion table corresponds to "X", the "one row below, one column right" for "B" in the password conversion table corresponds to "f", and the "one row below, one column right" for "Q" in the password conversion table corresponds to "t", with the result that a character string to be entered by the user is "Xft".

The central computer determines a character string to compared to the character string entered by the user from the password conversion rule which has been pre-registered for that particular user. The character string is compared with the character string "Xft" entered by the user for user verification. When the character strings are equal to each other, the user verification is successful; when the strings are not equal, the user verification fails.

Even in the case where the card in the present invention was missing or stolen or copied, if the predetermined positions as well as the predetermined row and column shift numbers are not missing or stolen or copied, then there is a low possibility that the card can be illegally used. Since the prior art password has a security problem when a word described in a dictionary is used as the password, this inevitably results in that the user is forced to use a hard-to-memorize character string. Whereas, the password utilization positions and password conversion method of the present invention are easy to memorize when compared to the prior art counterparts.

According to an embodiment, the row and column shift numbers may be 0 and 1 or 2 in their vertical and horizontal directions respectively. It is desirable to avoid having the row shift number or the column shift number be 0. In this case, in the table of the card, 24 sorts of positions around the found character are possibly considered to be conversion methods. It is also desirable that the table of the card consist of 5 or more rows and 5 or more columns. On the other hand, when the table is too large, it may be difficult to locate a character. Therefore, it is preferable to be able to modify the size of the table according to the level of the user's expertise.

In general, when the fundamental password conversion table is colored or surrounded by bold lines, it is convenient because it is easy for users to distinguish it from the rest of the table. In the case of the alphanumeric set, when upper case characters are colored in blue and numbers are colored in red for distinction therebetween, for example, it is convenient because the users can easily find a desired character.

In the foregoing example, the conversion method has been previously registered in the center. In this method, however, when the card, the display character string and the input character string were all stolen, it becomes easy for an unauthorized person to decode the password conversion rule.

As a technique for solving the above problem, there is a method wherein the row and column shift numbers are not pre-registered, but are determined according to characters in the display character string to be displayed by the center. For example, positions (password shift designation character positions) of characters for which the row and column shift numbers are to be specified are previously registered in the center. In this case, explanation will be made in connection with a case where the password shift designation character position is the third character.

In the above example, the third character in the display character string is "X". When this character is searched from the card, the position of "X" corresponds to a 2-row upward shift and a 2-column rightward shift from a pre-determined spot within the table, in this case, the central position containing the character "b." So it is known that the row and column shift numbers in this user verification process are "2-row upward, 2-column rightward". Using this technique lowers the risk that the password can be discovered, since the row and column shift numbers are modified for each user verification.

In this technique, contents to be memorized by the user are 4 sorts of numbers, i.e., "third" and "fifth, first and ninth". That is, this method only requires that the user memorize a password number equivalent in difficulty to a password used in an automatic teller machine or the like. In addition, however, intervention of the password conversion card enables a security much higher than the above password number.

As has been explained in the foregoing, in accordance with the present invention, use of the password conversion rule enables realization of user verification without the password being decoded. Further, when a card having the password conversion table described therein is used, even a novice can readily use the password and be verified correct user in a simple and safe manner. The present invention has the effect of providing the necessary level of security, even when the length of a character string entered by the user is short, and, even should the password conversion table be stolen, there is a low danger that the entire password can be fully decoded. Further, media for storing therein operations carried out by the central computer and user for user verification enable realization of convenient computer operations.

Although the invention has been described in detail in the foregoing for the purpose of illustration only, it is understood that such detail is solely for that purpose and that variations can be made therein by those of ordinary skill in the art without departing from the spirit and scope of the invention, as defined by the following claims, including all equivalents thereof.

I claim:

1. A method for identifying a user through a computer communication network comprising:

sending a string of characters randomly selected from a set of characters recorded in a conversion table from a central computer which is accessed by said user by a terminal computer;

obtaining at least one character selected from the group consisting of characters as they are and converted characters from said string of characters by a predetermined conversion rule;

sending said obtained at least one character to said central computer from said terminal computer; and identifying said user of said terminal computer based on said string of characters randomly selected, said predetermined conversion rule and said obtained at least one character sent from said terminal computer.

2. The method of claim 1, wherein said obtaining step comprises:

extracting at least one character positioned in said string by a predetermined rule;

searching at least one position corresponding to the extracted character in said conversion table; and obtaining at least one character from said conversion table which is located at a position shifted by a predetermined offset in row, column and direction with respect to said extracted character.

3. The method of claim 1, wherein said obtaining step comprises:

identifying a position of at least one character in said string of characters by a predetermined rule in said conversion table;

obtaining an offset in row, column and direction of said at least one character from a predetermined position in said conversion table;

obtaining at least one character positioned in said string by a predetermined rule;

searching at least one position of said at least one character recorded in said conversion table; and obtaining a second at least one character from said conversion table which is located at a position shifted by said offset in row, column and direction with respect to said at least one character at said at least one position.

4. A central computer which is connected to at least one terminal computer operated by a user for identifying said user, said central computer comprising;

a data storage for a set of characters recorded in a conversion table, a device for generating a string of characters from said data storage, a device for sending said string of characters, a device for selecting one or more characters from said string of characters, a device for obtaining one or more characters as they are or one or more converted characters according to a predetermined conversion rule designated to said user, and a device for identifying said user based on said one or more characters as they are or said one or more converted characters with one or more characters sent from said terminal computer operated by said user.

5. A medium containing a set of instructions which will cause a central computer connected to a terminal computer through a computer communication network to perform the steps of:

generating a string of randomly selected characters from a set of characters recorded in a table when accessed by a user;

sending said string of said randomly selected characters to said terminal computer;

obtaining one or more characters as they are or one or more converted characters from said string of randomly selected characters by a predetermined conversion rule;

receiving one or more characters from said terminal computer; and identifying said user operating said terminal computer based on said randomly selected string of characters, said predetermined conversion rule and said one or more characters from said terminal computer.

6. The medium of claim 5, wherein said table comprises a set of characters recorded in m rows and n columns, said table arranged such that said characters recorded at a position of (x,y), (x,y+s), (x+r,y) and (x+r, y+s) are identical, wherein (x+r) is less than or equal to m and (y+s) is less than or equal to n, and wherein x, y, r, s, m and n are positive intergers.

7. The medium of claim 6, wherein m, n, r and s are greater than or equal to 5.

8. The medium of claim 7, wherein, m=n=9 and r=s=5.

9. The medium of claim 5, wherein said table comprises a card having a visual display of a set of characters.

10. A medium containing a set of instructions which will cause a terminal computer connected to a central computer through a computer communication network to perform the steps of:

receiving from said central computer a string of characters which is generated in said central computer by randomly selecting characters recorded in a table; and sending one or more characters which are selected by the user from said string by a predetermined rule from said terminal computer to said central computer.

11. A method of identifying a user through a computer communication network comprising a central computer connected to at least one terminal computer, said method comprising the steps of:

sending a string of characters from said central computer to said terminal computer, said string randomly selected from a character set recorded in a conversion table;

converting at least one of said characters in said string by a conversion rule into a converted result;

sending said converted result to said central computer from said terminal computer; and identifying said user by collating within said central computer, said string of characters, said conversion rule and said converted result.

12. The method of claim 11, wherein said conversion rule comprises a predetermined conversion rule.

13. The method of claim 11, wherein said character set comprises an alphanumeric set.

14. The method of claim 11, wherein said character set comprises a numeric set of plural digits.

15. The method of claim 11, wherein said conversion rule comprises:

extracting a first at least one character located at a predetermined position in said string;

searching said conversion table for said first at least one character; and obtaining a converted result comprising a second at least one character from said conversion table which is located at a position within said conversion table which is shifted by a predetermined offset with respect to said first at least one character.

16. The method of claim 11, wherein said conversion rule comprises:

extracting a first at least one character located at a predetermined position in said string;

searching said conversion table for said first at least one character;

determining the row offset based on the position of said first at least one character within said conversion table;

determining the column offset based on the position of said first at least one character within said conversion table;

extracting a second at least one character located at a predetermined position in said string;

searching said conversion table for said second at least one character; and obtaining a converted result comprising a third at least one character from said conversion table which is located at a position within said conversion table which is shifted by said column offset and said row offset with respect to said second at least one character.

17. A method for identifying a user through a computer communication network comprising sending a string of characters randomly selected from a set of characters recorded in a conversion table from a central computer which is accessed by said user by a terminal computer;

searching a position or positions described in said conversion table with respect to a first one or more characters located at a predetermined character position in said string;

acquiring a second one or more characters from said conversion table located at a position shifted by a predetermined row, column and direction offset with respect to said first one or more characters on the basis of a searched position or positions to obtain an input string to be sent by said user;

sending said input string from said terminal computer to said central computer; and identifying said user based on said string of characters, said predetermined conversion rule and said input string.

18. A method for identifying a user through a computer communication network comprising:

sending a string of characters randomly selected from a set of characters recorded in a conversion table from a central computer which is accessed by said user by a terminal computer;

searching a position or positions of characters of said string in said conversion table located at a predetermined password shift designation character position or positions;

comparing the searched said position or positions with a predetermined reference position or positions to obtain row and column shift numbers and shift directions;

searching a position or positions of a second character or characters of said string located at predetermined password character positions or positions in said conversion table;

acquiring a third character or characters from said conversion table located at a position or positions shifted by a predetermined row, column and direction offset with respect to said second character or characters on the basis of said searched position or positions to obtain an input string to be entered by said user;

sending said input string from said terminal computer to said central computer; and identifying said user based on said string of characters, said predetermined conversion rule and said input string.

* * * * *